(12) United States Patent
Tod et al.

(10) Patent No.: US 8,098,630 B2
(45) Date of Patent: Jan. 17, 2012

(54) SCANNING METHODS AND APPARATUS FOR SYSTEM ACQUISITION

(75) Inventors: Anthony William Tod, St. Agatha (CA); Anton Pavlovich, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 922 days.

(21) Appl. No.: 12/118,143

(22) Filed: May 9, 2008

(65) Prior Publication Data
US 2009/0279508 A1    Nov. 12, 2009

(51) Int. Cl.
*H04J 13/00* (2011.01)
*H04B 7/216* (2006.01)
*H04W 4/00* (2009.01)

(52) U.S. Cl. .................. 370/332; 370/335; 370/342
(58) Field of Classification Search .................. None
See application file for complete search history.

(56) References Cited

U.S. PATENT DOCUMENTS

| | | | |
|---|---|---|---|
| 5,081,679 A | 1/1992 | Dent | |
| 5,442,806 A | 8/1995 | Barber et al. | |
| 6,438,117 B1 | 8/2002 | Grilli et al. | |
| 6,704,552 B1 | 3/2004 | Matsumoto | |
| 6,985,432 B1 * | 1/2006 | Hadad | 370/203 |
| 7,006,840 B2 * | 2/2006 | Bultan et al. | 455/502 |
| 7,443,826 B1 * | 10/2008 | Atarius et al. | 370/342 |
| 7,684,373 B2 * | 3/2010 | Ekvetchavit et al. | 370/335 |
| 2002/0146039 A1 | 10/2002 | Demir et al. | |
| 2003/0007471 A1 | 1/2003 | Terasawa et al. | |
| 2004/0109431 A1 | 6/2004 | Abrahamson et al. | |
| 2004/0162073 A1 | 8/2004 | Yoneyama et al. | |
| 2005/0101278 A1 * | 5/2005 | Peng | 455/250.1 |
| 2005/0117547 A1 | 6/2005 | Lu | |
| 2007/0189259 A1 | 8/2007 | Sollenberger et al. | |
| 2007/0230634 A1 | 10/2007 | Demir | |

FOREIGN PATENT DOCUMENTS
FR    2857209 A    1/2005

OTHER PUBLICATIONS

Search Report and Opinion for EPO Application #08156027.8—Date: Jan. 19, 2009.
Partial European Search Report, Nov. 17, 2008, EPO Application # 08156027.8.
Nielsen et al., "WCDMA Initial Cell Search", IEEE, 2000.

* cited by examiner

*Primary Examiner* — Chi Pham
*Assistant Examiner* — Soon-Dong Hyun
(74) *Attorney, Agent, or Firm* — John J. Oskorep, Esq.

(57) ABSTRACT

In one illustrative example, a system acquisition method suitable for use in W-CDMA utilizes a receiver having an automatic frequency control (AFC) circuit. A system acquisition scan is performed over a plurality of candidate frequencies in an RF band. During the system acquisition scan, a pilot signal of a system on one of the candidate frequencies is detected. When information of the system is successfully decoded, and the system is different from a requested system (e.g. not the RPLMN or HPLMN), the pilot signal of the system is assigned as a timing reference in the receiver for one or more remaining candidate frequencies of the system acquisition scan. Therefore, an AFC window time otherwise needed to converge on a remaining candidate frequency is not needed or reduced.

23 Claims, 7 Drawing Sheets

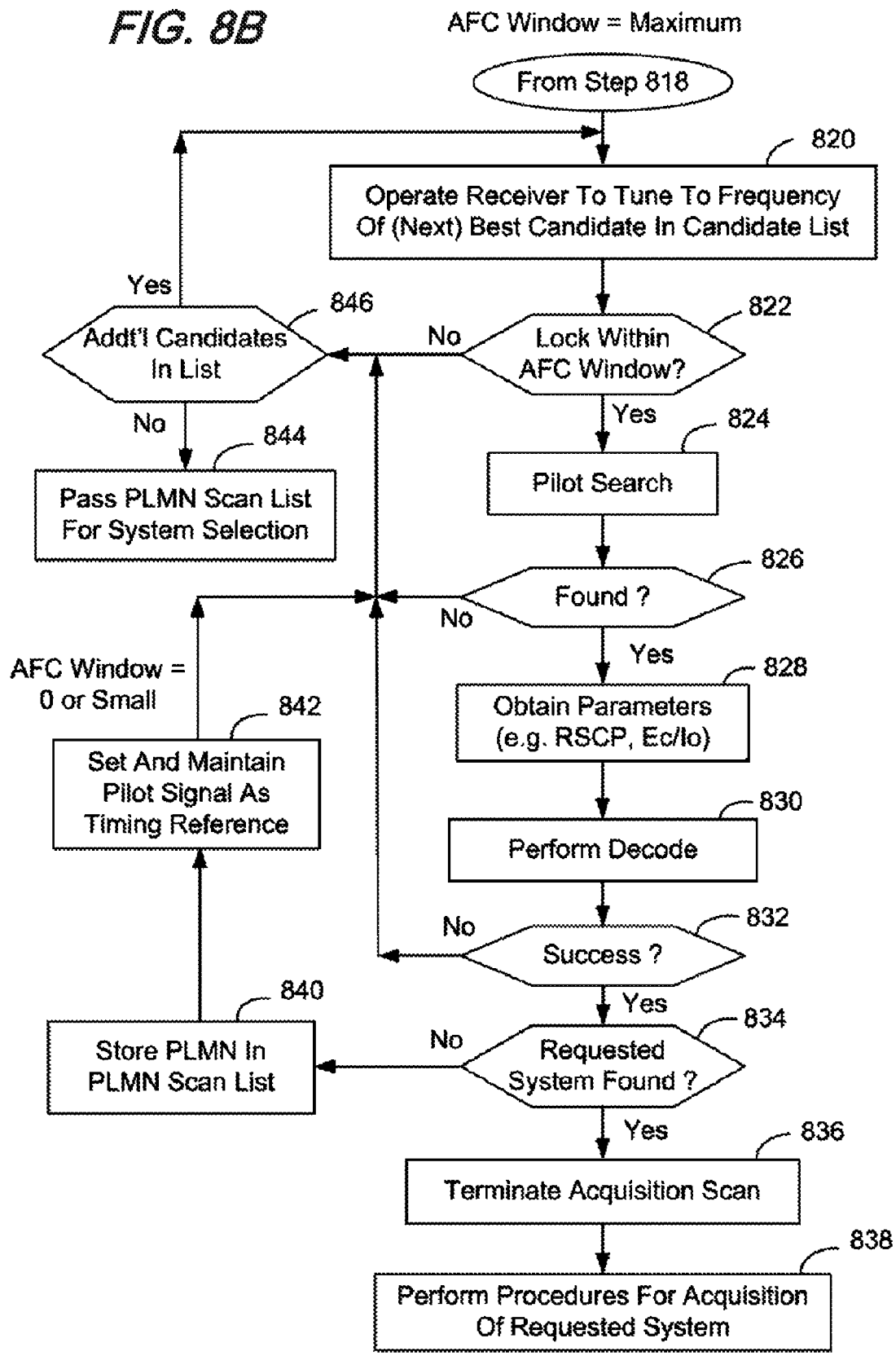

SCANNING METHODS AND APPARATUS FOR SYSTEM ACQUISITION

BACKGROUND

1. Field of the Technology

The present disclosure relates generally to methods and apparatus for use in a system acquisition scan, and more particularly to system acquisition utilizing a pilot signal of a non-requested system as a timing reference for remaining channels.

2. Description of the Related Art

Wireless communication systems are widely deployed to provide various types of communication such as voice and data. These systems may be based on code division multiple access (CDMA), time division multiple access (TDMA), or some other modulation techniques. A Wideband (W-CDMA) system provides certain advantages over other types of systems, including increased system capacity. Wireless communication systems typically include a plurality of base stations. Base stations in a system may communicate on one or more frequencies, and neighboring systems often utilize different frequencies as well. Systems such as W-CDMA differentiate base stations with unique codes.

Periodically, a mobile station needs to "acquire" a system, such as upon power-up or when traveling near the edge of an already acquired system. System acquisition begins with locating one or more frequencies used by a system. Subsequently, the code and its phase must be identified in order to communicate with any particular base station.

Various searching techniques are known in the art for acquiring base stations at a given frequency. System acquisition time is a function of the time required to locate the frequency of a system as well as the time required to search and acquire the code of a base station on that system. It is desirable for a mobile station to acquire base stations as rapidly as possible. Upon initial acquisition, users appreciate quick response time, so the acquisition time should be minimized. Furthermore, prompt acquisition of neighbor base stations allows the mobile station to communicate with the optimal set of base stations available. A mobile station communicating with the best set of base stations minimizes required transmit power for a given communication performance level, which results in system resources being allocated efficiently. This results in maximization of system capacity, as well as power reduction in the mobile station.

Reduced power in the mobile station translates to extended communication and standby times for a given battery configuration, or reduced battery requirements (size, weight and cost), or both. Minimizing system acquisition time facilitates realizing these benefits.

Accordingly, there is a need for reducing the time required in system acquisition scan.

BRIEF DESCRIPTION OF THE DRAWINGS

Embodiments of present invention will now be described by way of example with reference to attached figures, wherein:

FIGS. 8*a*-8*b* form a flowchart which helps describe a system acquisition method of the present disclosure.

DETAILED DESCRIPTION OF THE PREFERRED EMBODIMENTS

In one illustrative example of the present disclosure, a system acquisition method suitable for use in wideband code division multiple access (W-CDMA) utilizes a receiver having an automatic frequency control (AFC) circuit. A system acquisition scan is performed over a plurality of candidate frequencies of an RF band. During the system acquisition scan, a pilot signal of a system on one of the candidate frequencies is detected. When information of the system is successfully decoded, and the system is different from a requested system (e.g. it is not the registered PLMN or "RPLMN", or home PLMN or "HPLMN"), the pilot signal of the system is assigned as a timing reference in the receiver for one or more remaining candidate frequencies of the system acquisition scan. Therefore, an AFC window time otherwise needed to converge on a remaining candidate frequency is not needed or reduced.

Figure 1:
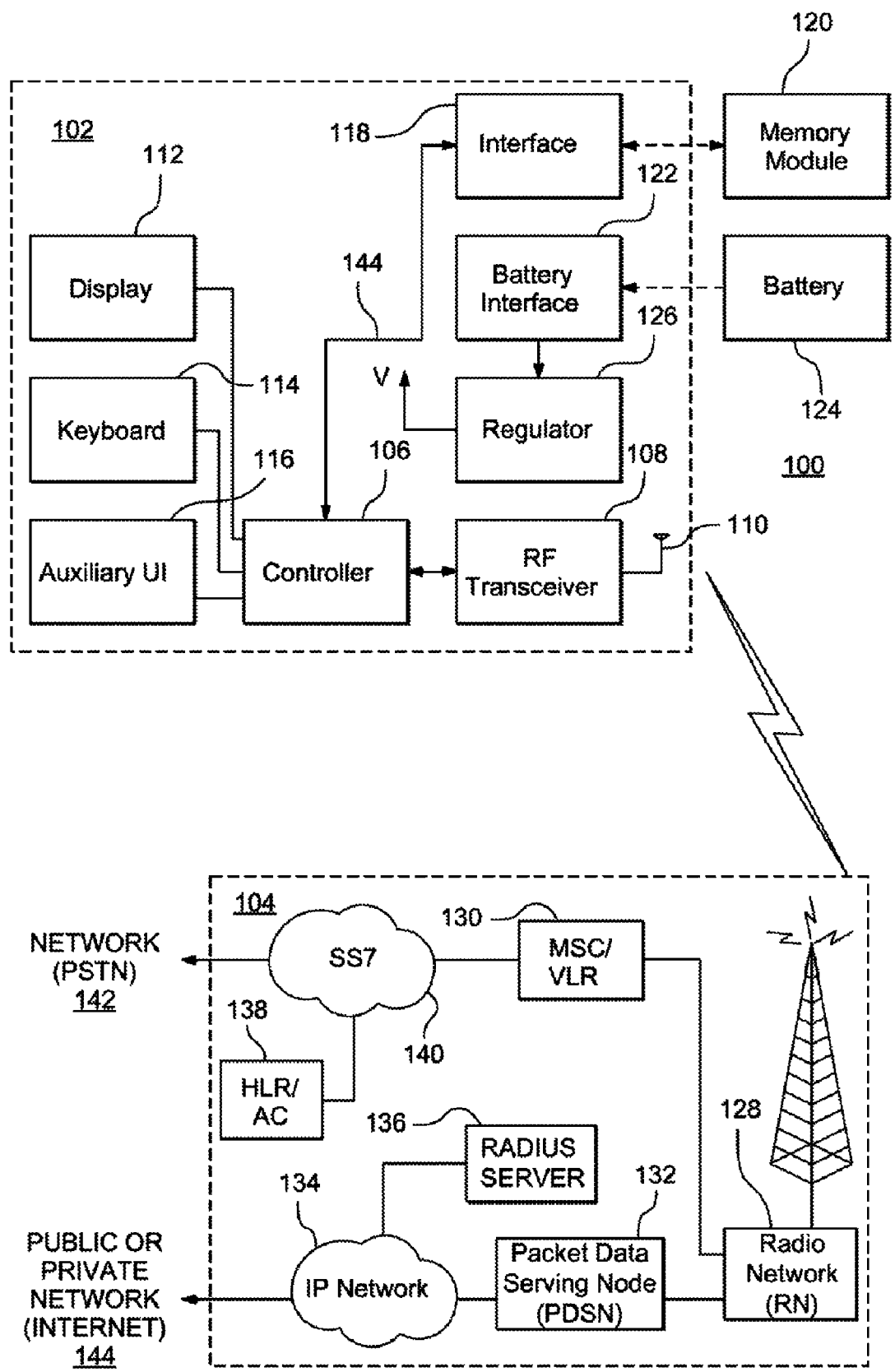
FIG. 1 is a block diagram which illustrates pertinent components of a mobile station and a wireless communication system.

Illustrating one exemplary environment in which the techniques of the present disclosure may be practiced, FIG. 1 is a block diagram of a communication system 100 which includes a mobile station 102 which communicates through a wireless communication system 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to system 104, a telephone number to place a telephone call, commands to be executed on mobile station 102, and possibly other or different user inputs.

Mobile station 102 sends communication signals to and receives communication signals from system 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless system or systems in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically keyed or turned on only when it is sending to a system, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into memory module 120 which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication system 104. In the embodiment of FIG. 1, wireless system 104 is a Third Generation (3G) supported system based on Code Division Multiple Access (CDMA) technologies. In particular, wireless system 104 may be a Wideband CDMA (WCDMA) system which may include fixed system components coupled as shown in FIG. 1. Wireless system 104 in FIG. 1 includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

Note that systems may be designed to support one or more CDMA type standards such as (1) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (2) the "TIA/EIA-95-B Mobile Station-Base Station Compatibility Standard for Dual-Mode Wideband Spread Spectrum Cellular System" (the IS-95 standard), (3) the standard offered by a consortium named "3rd Generation Partnership Project 2" (3GPP2) and embodied in a set of documents including "C. S0002-A Physical Layer Standard for cdma2000 Spread Spectrum Systems, the "C. S0005-A Upper Layer (Layer 3) Signaling Standard for cdma2000 Spread Spectrum Systems, and the "C. S0024 cdma2000 High Rate Packet Data Air Interface Specification" (the cdma2000 standard), and (4) other suitable standards. Non-CDMA systems include the AMPS and GSM systems, as examples. The term W-CDMA system as used herein refers to any suitable system, compatible with W-CDMA or otherwise, within which the techniques of the present disclosure may be suitably practiced.

During operation in this system environment, mobile station 102 communicates with RN 128 which performs functions such as call-setup, call processing, and mobility management. RN 128 includes a plurality of base station transceiver systems that provide wireless system coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different systems. For example, one system may employ a different modulation scheme and operate at different frequencies than other systems. The underlying services may also differ based on its particular protocol revision.

The wireless link shown in communication system 100 of FIG. 1 represents one or more different channels, typically different radio frequency (RF) channels, and associated protocols used between wireless system 104 and mobile station 102. An RF channel is a limited resource that must be conserved, typically due to limits in overall bandwidth and a limited battery power of mobile station 102. Those skilled in art will appreciate that a wireless system in actual practice may include hundreds of cells depending upon desired overall expanse of system coverage. All pertinent components may be connected by multiple switches and routers (not shown), controlled by multiple system controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless system 104 may be connected to other systems, possibly including other systems, not explicitly shown in FIG. 1. A system will normally be transmitting at very least some sort of paging and system information on an ongoing basis, even if there is no actual packet data exchanged. Although the system consists of many parts, these parts all work together to result in certain behaviours at the wireless link.

Figure 2:
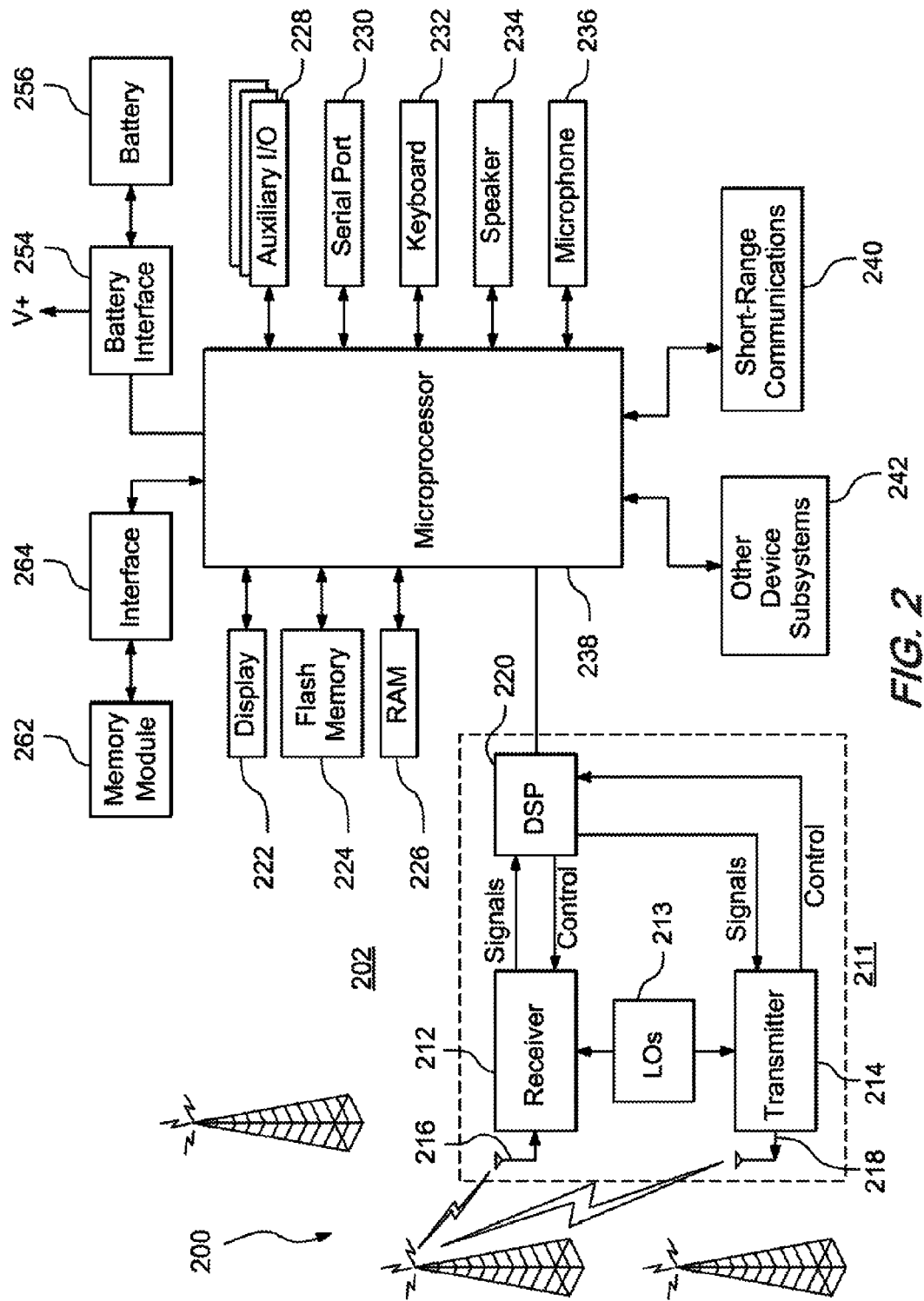
FIG. 2 is a more detailed diagram of a preferred mobile station of FIG. 1.

FIG. 2 is a detailed block diagram of a preferred mobile station 202. Mobile station 202 is preferably a two-way communication device having at least voice and advanced data communication capabilities (i.e. 3G-capable), including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with (e.g. one providing a 3G-service), as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication system in which mobile station 202 is intended to operate.

Mobile station 202 may send and receive communication signals over the system after required system registration or activation procedures have been completed. Signals received by antenna 216 through the system are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication system via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the system. Alternatively, memory module 262 may be a non-volatile memory which is programmed with configuration data by a service provider so that mobile station 202 may operate in the system. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides a regulated voltage to the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless system. In a preferred embodiment, PIM data items are seamlessly integrated, synchronized, and updated via the wireless system, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through system, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication system through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication system. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Periodically, a mobile station needs to "acquire" a system upon power-up or when traveling near the edge of an already acquired system, as examples. System acquisition begins with locating one or more frequencies used by a system. Subsequently, the code and its phase must be identified in order to communicate with any particular base station. Various searching techniques are known in the art for acquiring base stations at a given frequency. Acquisition time is a function of the time required to locate the frequency of a system as well as the time required to search and acquire the code of a base station on that system. It is desirable for a mobile station to acquire base stations as rapidly as possible.

Searches involve a large number of detected cell measurements, looking for a specified Public Land Mobile Network (PLMN). During this time, there is no timing reference for the mobile station. Therefore, all detected cell measurements over the RF band require a substantial Automatic Frequency Control (AFC) convergence time before it can be confirmed that no actual cell exists on that frequency. In one implementation, it has been shown that a 500 millisecond (msec) timeout is needed, at which time a large enough frequency windowing has been attempted to discount any possibility that any cell exists on that center frequency. This takes into account any presently unknown offset with a strong enough signal to proceed to further stages in the detected cell function. In a radio environment where there is only a single system to be found (so other accelerations cannot be leveraged), and the cell itself is not the requested PLMN, it may take as much as six (6) minutes to resolve all possible detected cell measurements required—even when a system is found within moments.

Users appreciate quick response time, so the acquisition time should be minimized. Furthermore, prompt acquisition of neighbor base stations allows the mobile station to communicate with the optimal set of base stations available. A mobile station communicating with the best set of base stations minimizes required transmit power for a given communication performance level, which results in system resources being allocated efficiently. This results in maximization of system capacity, as well as power reduction in the mobile station. Reduced power in the mobile station translates to extended communication and standby times for a given battery configuration, or reduced battery requirements (size, weight and cost), or both. Minimizing system acquisition time facilitates realizing these benefits.

Figure 3:
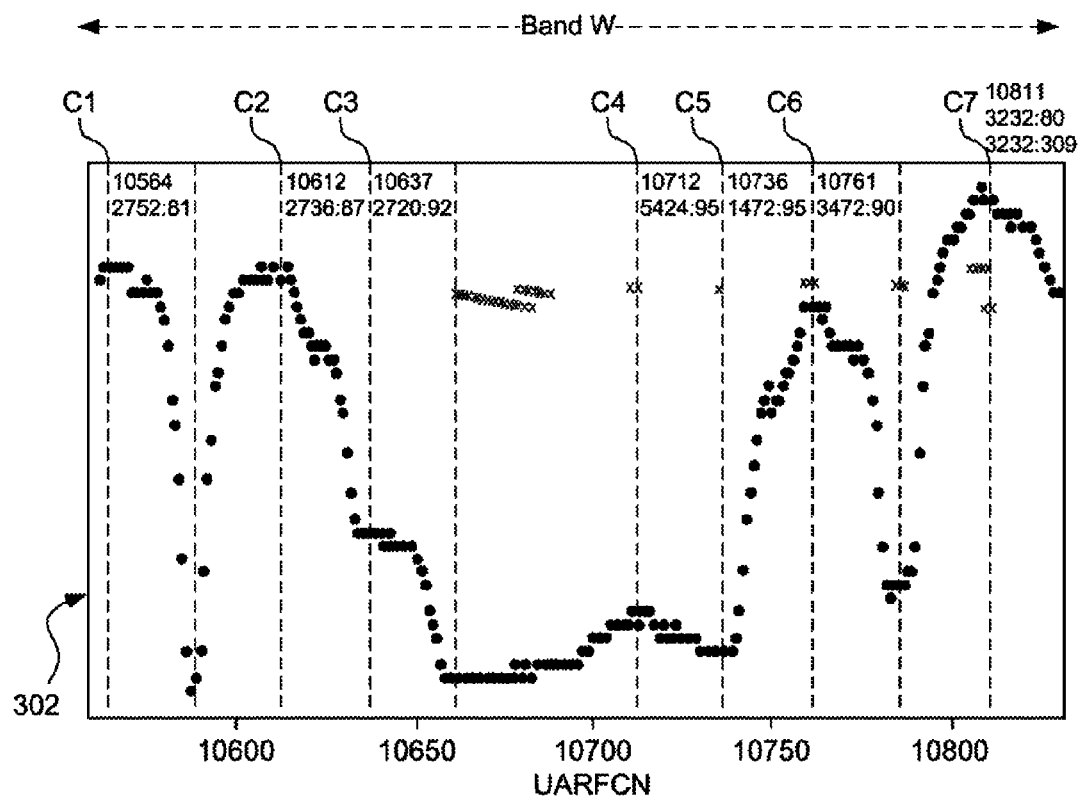
FIG. 3 depicts a graph of a radio frequency (RF) band to be relationship between signal strength and frequency within a bandwidth over which a frequency scan may be performed.

FIG. 3 depicts a graph 300 of a relationship between signal strength and frequency in an RF band having a bandwidth W within which a W-CDMA system acquisition scan may be performed. The frequency space is shown in FIG. 3 as being contiguous, but noncontiguous frequency spaces are also supported. The frequency space is divided into the total number N of possible carrier frequencies. In the present embodiment in FIG. 3, the number of possible center frequencies relate to the number of possible UARFCNs. UARFCNs are UMTA Terrestrial Radio Access (UTRA) Absolute RF Channel Numbers. In FIG. 3, from 10562 to 10838, there are 277 UARFCNs on a 200 KHz raster. The calculation to actual frequency is dependent on the band for offset, but is simple for bandwidth W, UARFCN=5*frequency. The range for the actual frequency is 2112.4 to 2167.6 MHz. In the example shown in FIG. 3, there are seven identified W-CDMA systems, having center frequencies labeled C1, C2, C3, C4, C5, C6, and C7. A receiver threshold line 302 in graph 300 represents a minimum signal strength threshold, and reveals that C1-C7 may have sufficient energy to exceed this minimum threshold. A false positive is a frequency at which sufficient power is received that the threshold is exceeded, but that does not have a system transmitting at that frequency. Note also that a subset of the N frequencies may be selected, referred to as coarse frequencies.

A clock in a mobile station, such as a voltage-controlled temperature-compensated crystal oscillator (VCTCXO), is necessary to properly detect signals in the RF band. The clock controls the frequency of the code/sequences (e.g. Walsh code and PN sequences) generated in the mobile station. The mobile station adjusts the frequency of the VCTCXO by a process called automatic frequency control (AFC). A rotation of signal constellation of in-phase and quadrature-phase outputs of a correlator in the mobile station indicates frequency error between the clock in the mobile station and the clock in the base station. In-phase correlator (I-C) output and quadrature-phase correlator (Q-C) outputs are determined for a chip length of, for example, 256 chips. The I-C and Q-C outputs for successive chip lengths may be plotted to illustrate the signal constellation. If there is no frequency error between the mobile station and the base station, the signal constellation remains stationary. If there is a frequency error, however, the signal constellation rotates around the origin.

Figure 5:
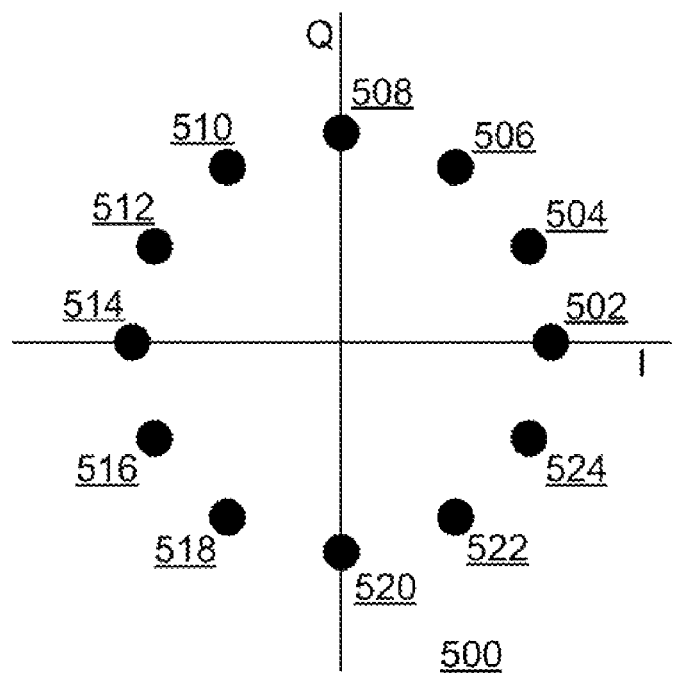
FIG. 5 illustrates an example of correlator outputs for a signal constellation.
Figure 6:
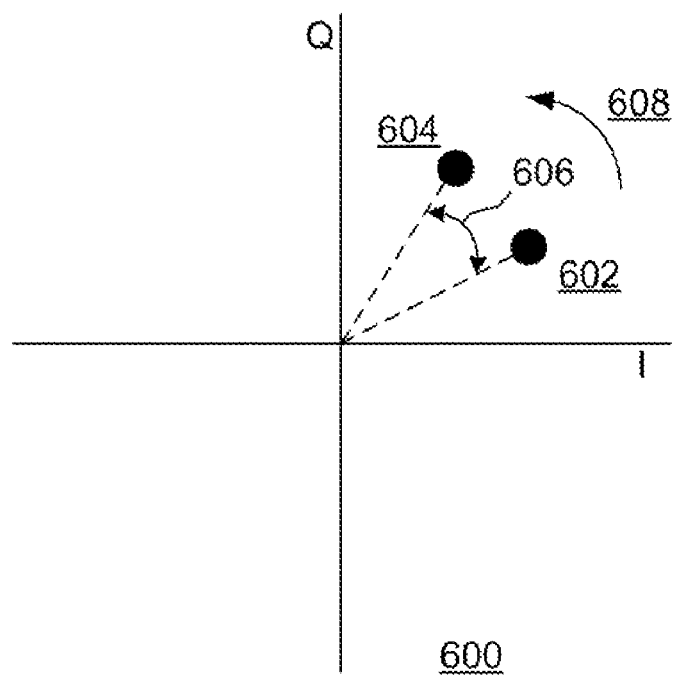
FIG. 6 illustrates an example of a frequency error depicted as an angle of rotation and a direction of rotation of a signal constellation.

With reference to FIG. 5, an example of a signal constellation 500 when there is a frequency error between the received signal and the reference signal is shown. Correlator outputs 502 through 524 represent plots of the I-C and Q-C outputs after successive chip lengths. For example, a correlator output 502 may represent a plot of the I-C and Q-C outputs after 256 chips. A correlator output 504 may represent a plot of the in-phase and quadrature-phase correlator outputs after another 256 chips. Due to a frequency error, correlator outputs 502 through 524 rotate around the origin. The angle of rotation of signal constellation 500 is proportional to the frequency error between the W-CDMA signal and the reference signal. The direction of rotation of the signal constellation indicates whether the reference frequency of the VCTCXO is too fast or too slow. AFC uses the angle of rotation and the direction of rotation of the signal constellation to estimate the frequency error between the carrier signal and the reference signal and to adjust the frequency of the reference signal accordingly. In FIG. 6, the angle of rotation 606 and the direction of rotation 608 of a signal constellation 600 are illustrated, where there is a frequency error between the signal and the reference signal. Correlator outputs 602 and 604 may correspond to correlator outputs 502 and 504 in FIG. 5 calculated after successive correlation lengths. AFC generally adjusts the reference frequency of the VCTCXO until angle of rotation 606 becomes zero.

Figure 4:
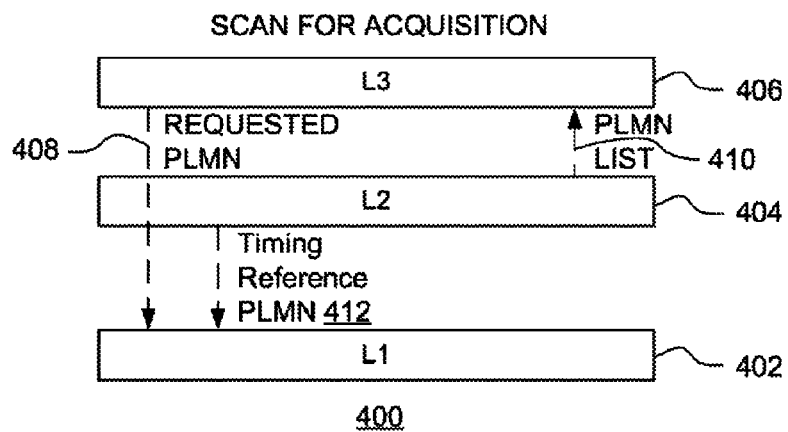
FIG. 4 is a block diagram of layer processing components 600 of the mobile station of FIGS. 1 and 2, for use in relation to the system acquisition scanning techniques of the present disclosure.

Referring now to FIG. 4, a block diagram of layer processing components 400 of the present disclosure is shown. Layer processing components 400 may be provided in the mobile station of FIGS. 1 and 2 for W-CDMA system acquisition techniques of the present disclosure. Again, the term W-CDMA system as used herein refers to any suitable system, compatible with W-CDMA or otherwise, within which the techniques of the present disclosure may be suitably practiced.

This diagram of FIG. 4 is based on the Open System Interconnection (OSI) mode. As shown, layer processing components 400 include a layer-1 processing component 402, a layer-2 processing component 404, and a layer-3 processing component 406. In general, layer-1 processing component 402 is adapted to perform layer-1 or physical layer processing, which includes basic signal reception, AFC processing, and signal despreading. Layer-2 processing component 404 is adapted to perform layer-2 or data link layer processing, which includes the decoding of information (such as decoding system identification over a broadcast channel). Finally, layer-3 processing component 406 is adapted to perform layer-3 or network layer processing, which includes system selection and control techniques.

A system acquisition scan is initiated in response to a predetermined event, such as power up of the mobile station. Layer-3 processing component 406 provides a requested PLMN 408 to layer-1 processing component 402. The requested PLMN 408 may be the registered PLMN (RPLMN), or other suitable requested PLMN such as the home PLMN (HPLMN). If the requested PLMN 408 is found at any time during the system acquisition scan, the scan is terminated and the requested PLMN is acquired. Layer-2 processing component 404 builds and maintains a PLMN scan list of other PLMNs identified during the system acquisition scan. If there are no more candidate frequencies to test and the requested PLMN 408 was not found, layer-2 processing component 404 passes the PLMN scan list 408 to layer-3 processing component 404. This is done so that layer-3 processing component 404 may perform PLMN selection techniques with use of the PLMN scan list 408 (e.g. PLMN roaming techniques).

With conventional techniques, however, there is no timing reference from a system for carrier detection in the mobile station during system acquisition. Therefore, signal detection requires a substantial AFC convergence time before confirmation that no actual cell exists on a given frequency. A relatively large frequency windowing needs to be attempted to discount any possibility that any cell exists on that center frequency. This takes into account any presently unknown offset with a strong enough signal to proceed to further stages in the detected cell function.

According to techniques of the present disclosure, if a pilot signal of a W-CDMA system is detected on a given frequency, and information of the W-CDMA system is successfully decoded (i.e. which confirms or increases the confidence that the candidate cell is part of an actual W-CDMA system), layer-2 processing component 404 signals a pilot indication 412 to layer-1 processing component 402. This pilot indication 410 signals or instructs layer-1 processing component 402 to utilize (or at least consider) the pilot signal of the (non-requested) W-CDMA system as a timing reference for remaining candidate frequencies of the RF band. All other processes operate as normal during the system selection scan. Since a timing reference is provided for remaining candidate frequencies in this case, little to no AFC window time is needed for detecting the remaining candidate frequencies in the system acquisition scan. Therefore, the time to perform system acquisition scanning is reduced. By indicating that only little or no AFC window time is needed, it is understood that the needs of varying Doppler between the timing reference and the target frequency are still accounted for, for the worst case scenario as defined for the mobile station, where the mobile station is moving directly away or towards one the reference cell, on a direct line with the possible target cell. It is noted that the techniques of the present disclosure will operate optimally if strong frequency calibration exists across W-CDMA systems.

Layer-1 processing component 402 remains frequency-locked to the pilot signal timing reference in the system acquisition scan without the need for any signaling or communication to the cell itself (i.e. this may be an entirely passive operation). Anytime during the system acquisition scan, layer-2 processing component 404 may provide an updated (i.e. new) pilot signal indication of a new system to layer-1 processing component 402 to utilize as a new timing reference. In response, layer-1 processing component 402 may accept the new pilot signal indication and utilize the new timing reference for the remaining part of the system acquisition scan. In one embodiment, however, layer-1 processing component 402 may include a selection mechanism adapted to select the most suitable or optimal timing reference from a plurality of timing references offered from layer-2 processing component 404 (i.e. the pilot signal associated with the best quality, e.g. the largest or best Received Signal Code Power (RSCP) and/or Energy/Interference Ratio (Ec/Io)). On the other hand, if the current pilot signal timing reference falls below a predetermined threshold value of quality, layer-1 processing component 402 may reject the use of the current pilot signal as the timing reference (in which case the relatively large frequency windowing would again be necessary), and may select a new more suitable timing reference (e.g. the next best timing reference) for the remaining part of the system acquisition scan.

Figure 7:
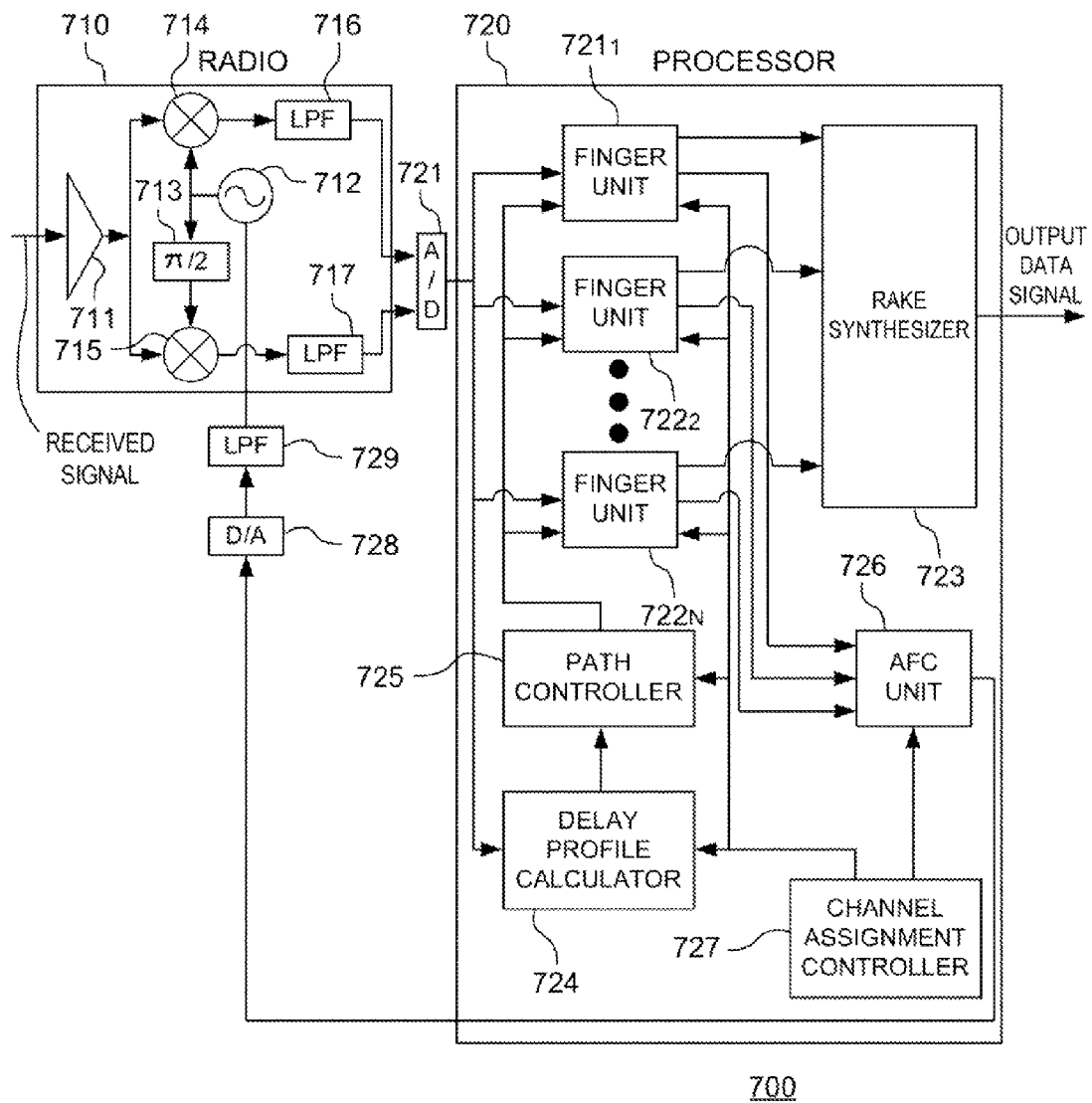
FIG. 7 is a schematic block diagram of electronic components 700 of the mobile station of FIGS. 1 and 2 which may be used in relation to the system acquisition techniques of the present disclosure.

Referring now to FIG. 7, a more detailed schematic block diagram of electronic components 700 of the mobile station of FIGS. 1 and 2 which may be used in relation to the system acquisition scanning techniques of the present disclosure is shown. In FIG. 7, the conventional receiver comprises a radio 710 which obtains analog I and Q signals from a received signal received by an antenna (not shown), an A/D converter 721 which converts analog I and Q signals to digital I and Q signals, a signal processor 720 which processes the digital I and Q signals to output a digital frequency control signal for controlling an operation frequency of the receiver, a D/A converter 728 which converts the digital frequency control signal to an analog frequency control signal, and a low-path filter 729 which shapes a waveform of the analog frequency control signal and supplies the resulting signal to the radio 710.

In the radio 710, an amplifier 711 amplifies the received signal from an antenna (not shown). A voltage control oscillator 712 enables its oscillating frequency to be controlled according to a voltage of the analog frequency control signal from the low-pass filter 729. A phase shifter 713 shifts an output signal from the voltage control oscillator 712 by $\pi/2$. A multiplier 714 multiplies the amplified received signal from the amplifier 711 by the output signal from the voltage control oscillator 712. A multiplier 715 multiplies the amplified received signal from the amplifier 711 by an output signal from the phase shifter 713. Low-path filters 716 and 717 shape waveforms of output signals from the multipliers 714 and 715 to output analog I and Q signals, respectively. The A/D converter 721 converts the analog I and Q signals from the radio 710 to digital I and Q signals.

In the processor 720, each of finger units 722 1 to 722 n despreads the digital I and Q signals from the A/D converter 721 with a predetermined spread code and outputs a despread signal. In addition, each of the finger units 722 1 to 722 n extracts a pilot signal from the despread signal and converts all the symbols in the pilot signal to those in the same quadrant, then outputs the converted signal. A rake receiver 723 synthesizes the despread signals in the same phase and outputs the synthesized signal. A delay profile calculator 724 calculates an arrival phase of the received signal by each of a plurality of estimated multi-path delays and a reception level in each arrival phase based on the digital I and Q signals from the A/D converter 721 and outputs the results as a delay profile of an object receiving channel. A path controller 725 determines a despread timing when each of the finger units 722 1 to 722 n despreads the digital I and Q signals according to the delay profile supplied from the delay profile calculator 724 and supplies an instruction signal indicative of the despread timing to each of the finger units 722 1 to 722 n.

An automatic frequency control (AFC) unit 726 calculates a difference between a frequency of a received signal and an oscillating frequency of the voltage control oscillator 712 so as to output a frequency difference signal as a digital frequency control signal. The calculation is based on signals output from the finger units 722 1 to 721 n, wherein all the symbols in the pilot signal are converted to those in the same quadrant at this time. A channel assignment controller 727 notifies the delay profile calculator 724 and the finger units 722 1 to 722 n of a receiving channel. The D/A converter 728 converts the digital frequency control signal output from the AFC unit 726 to an analog frequency control signal. The low-path filter 729 shapes the waveform of the analog frequency control signal output from the D/A converter 728 to supply the shaped analog frequency control signal to the voltage control oscillator 712.

The radio 710 samples both I and Q signals from a received signal received at an antenna (not shown) and supplies those sampled I and Q signals to the processor 720 via the A/D converter 721. On the other hand, the channel assignment controller 727 notifies the delay profile calculator 24 and the finger units 722 1 to 722 2 of information indicative of the receiving channel for the receiver, e.g., a predetermined spread code for despreading against the received signal of the receiving channel. Notified of the information indicative of the receiving channel, the delay profile calculator 724 calculates a correlated power value between the received signal from the radio 710 and a known transmission replica, and outputs the result as a delay profile of the receiving channel. The delay profile denotes an arrival phase of the received signal by each of the estimated multi-path delays and a receiving level for each arrival phase. The path controller 725 selects one of despread timings in a favorable receiving state from the delay profile of the receiving channel and directs the despread timing to the finger units 722 1 to 722 n respectively. Each of the finger units 722 1 to 722 n despreads and demodulates the received signal of the receiving channel notified from the channel assignment controller 727 at the despread timing directed from the path controller 725, then extracts the pilot signal from the despread and demodulated signal and converts all the symbols in the pilot signal to those in the same quadrant, then outputs the converted signal to the AFC unit 726.

The AFC unit 726 multiplies a conjugate complex number of a symbol by a complex number of the next symbol so as to calculate a phase difference per symbol time, then divides the result by a symbol time. This results in calculating a frequency difference corresponding to each finger unit, wherein the symbols are received from the finger units 722 1 to 722 2 and converted to those in the same quadrant. The AFC unit 726 then synthesizes the frequency differences and outputs the synthesized value to the D/A converter 728 as the digital frequency control signal. The output signal from the AFC unit 726 is converted from digital to analog in the D/A converter 728 and the waveform thereof is shaped in the low-path filter 729. The shaped signal from the low-pass filter 729 is used for controlling the oscillating frequency of the voltage control oscillator 712. Consequently, the oscillation frequency of the voltage control oscillator 712 is controlled so as to match with the frequency of the received signal.

Software on a DSP (e.g. DSP 220 of FIG. 2) controls the algorithmic aspects of the AFC. The AFC window time is defined by the state behavior of the AFC control algorithm, as opposed to any time kept by the AFC hardware. An interrupt is regularly triggered on a framing basis so that the DSP can examine an AFC frequency error value in an AFC frequency error register. The control algorithm then decides how to react based on the AFC frequency error value. Finger unit feeds which are connected to the estimator block in which the AFC unit 726 resides provide the inputs for estimating the frequency error. From this, the software algorithm determines how to adjust the frequency correction, attempting to keep the frequency error within acceptable limits. Thus, the receiver may control its operation frequency with use of the pilot signal of a receiving channel assigned thereto. It may take much time to match the operation frequency with the frequency of the received signal when there is no pilot signal (or other suitable signal from a system) to be used as a timing reference.

Figure 8A:
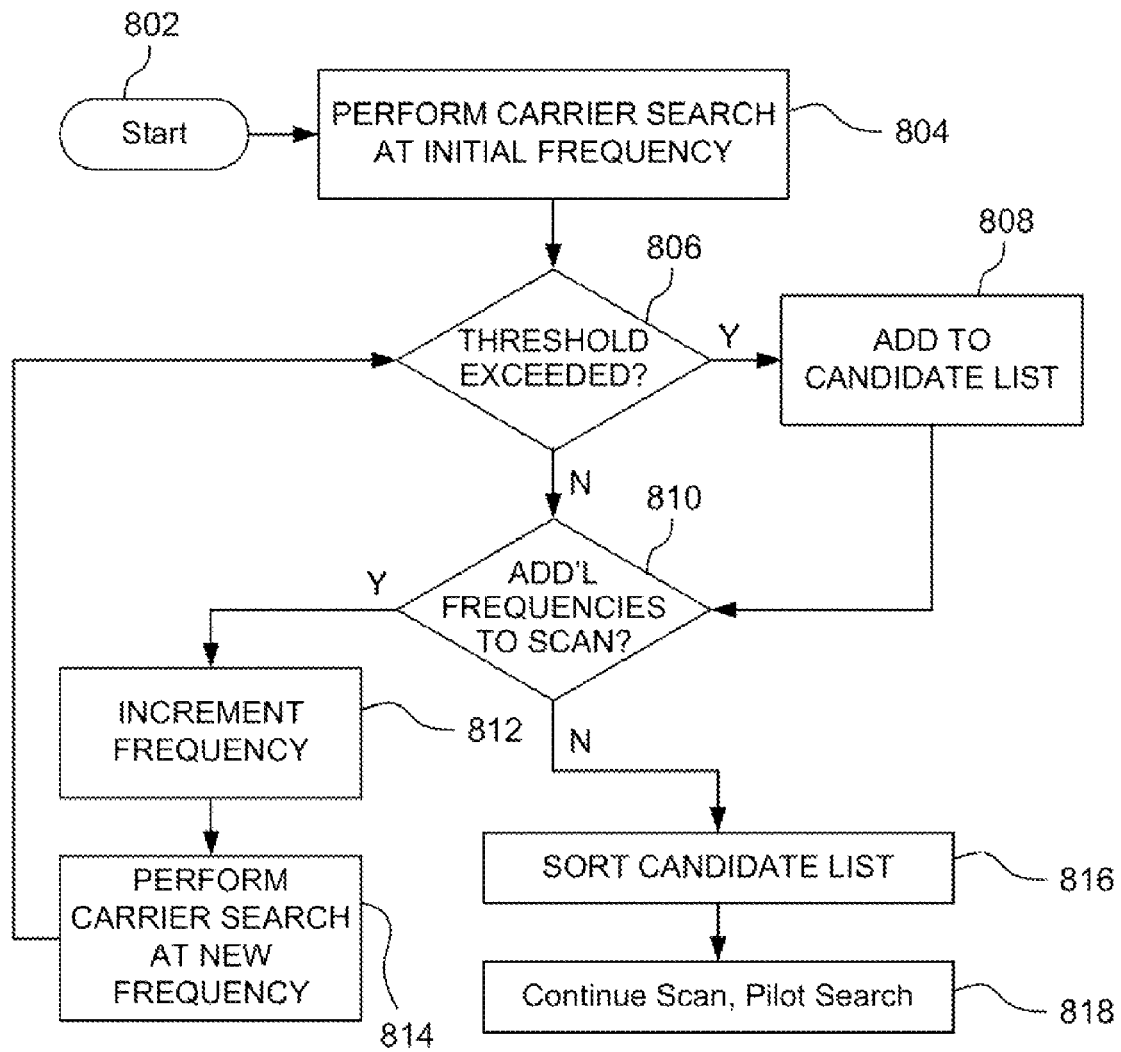

FIGS. 8A and 8B form a flowchart which helps describe the W-CDMA system acquisition scanning techniques of the present disclosure. N possible carrier frequencies of the total frequency space W (see e.g. FIG. 3) are searched sequentially, and when certain criteria are met, the carrier frequency candidate is added to a list sorted by received power. A further search is then performed on one or more of the best candidates in the list. Beginning at a start block 802 of FIG. 8A, a carrier search is performed at the initial frequency in step 804. Next, it is tested whether the received power (e.g. received signal strength indicator or "RSSI," e.g. from amplifier 711 of FIG. 7) at the candidate frequency exceeds a threshold in step 806. If yes at step 806, then the process proceeds to step 808 where the candidate with its associated power is added to a candidate list (preferably sorted in order of descending power). If in step 806 the threshold was not exceeded or, in step 808, the candidate was added to the candidate list, the process proceeds to step 810 to determine whether additional frequencies remain to be scanned. If yes at step 810, the process proceeds to step 812 to increment the candidate frequency, and then to step 814 to perform another carrier search at the new frequency. The loop formed by these steps may be repeated until all the frequencies have been searched. When no frequencies remain as identified in step 810, the candidate list is sorted, preferably in order of descending power, in step 816. In step 818, a further (pilot) search is performed on the highest energy candidate(s) in the candidate list, as will be discussed in relation to FIG. 8B.

Referring now to FIG. 8B, it is noted that the AFC window time is at a maximum or other relatively large value since no pilot or other signal of a system is being utilized as a timing reference in the receiver. To begin, the receiver is tuned to the frequency of the best candidate in the candidate list in step 820. If the receiver is locked within the AFC window time in step 822, then procedures for pilot searching are performed in step 824. If the receiver is not locked within the AFC window time in step 822, then it is checked whether there are additional candidates in the candidate list to consider in step 846. If there are additional candidates to consider in step 846, then the process repeats starting again at step 820. If there are no additional candidates to consider in step 846, the PLMN scan list is passed or provided so that a system selection procedure may be performed.

If a pilot signal of a system is found in step 826, parameters such as Received Signal Code Power (RSCP) and Energy/Interference Ratio (Ec/Io), are obtained in step 828. An attempt to decode information of the system over one or more channels is also performed in step 830. The information may be or include, for example, broadcast information, such as a system identification which identifies the system. If in step 834 the system identification of the system matches a predetermined system identification of the requested system based on comparing, the system acquisition scan is terminated in step 836 and the acquisition procedures are performed for acquiring the requested system in step 838.

In the embodiment described, the requested system is the registered PLMN (RPLMN), but could be another suitable requested PLMN such as the home PLMN (HPLMN). When starting a radio session, for example, the layer-3 processing component may use the following procedure for determining the requested PLMN to the layer-2 processing component: if there is a RPLMN available from a previous connected session, it will be used as the requested PLMN; otherwise, if there is no RPLMN available, but there is a HPLMN available, the HPLMN will be used as the requested PLMN; otherwise, if neither of the above, then an out-of-range PLMN will be used to force a full discovery of PLMNs available in the coverage area, where the list is returned to the layer-3 processing component on completion, and the best PLMN is selected.

If the system is different from the requested system, i.e. the requested system is not identified (i.e. there is a mismatch) in step 834, the identified PLMN is stored in the PLMN scan list in step 840. In addition, the pilot signal of the system may be set as the timing reference in the receiver in step 842. Here, the AFC window time will be zero (0) or some other very small value relative the initial AFC window time. As described earlier with reference to FIG. 4, layer-2 processing component 404 will signal the pilot indication 412 to layer-1 processing component 402. This pilot indication 410 signals or instructs layer-1 processing component 402 to utilize (or at least consider) the pilot signal of the system as a timing reference for remaining candidate frequencies of the RF band. During the system acquisition scan, if the current pilot signal timing reference falls below a predetermined threshold value of quality (e.g. based on testing of the RSCP and/or Ec/Io), the current pilot signal may be rejected as the timing reference (in which case the relatively large frequency windowing would again be necessary). Optionally, a new more suitable timing reference (e.g. the next best timing reference) may be utilized, if available, for the remaining part of the system acquisition scan.

If the decoding was not successful in step 832, or after setting and maintaining the pilot signal as the timing reference in step 842, it is again determined whether additional candidate frequencies are in the candidate list in step 846. If yes in step 846, then the process repeats starting again at step 820.

Thus, as described herein, a system acquisition method utilizing a receiver having an AFC circuit involves a system acquisition scan over a plurality of candidate frequencies. During the system acquisition scan, a pilot signal of a system on one of the candidate frequencies is detected. When information of the system is successfully decoded, and the system is different from the requested system (e.g. the system is not the RPLMN), the pilot signal of the system is assigned as a timing reference in the receiver for one or more remaining candidate frequencies of the system acquisition scan. An initial, relatively large AFC window time for the AFC circuit is needed prior to detecting any pilot signal and decoding any information in the system acquisition scan. The act of assigning the pilot signal as the timing reference, however, serves to reduce or eliminate the initial AFC window time for the AFC circuit for converging on a remaining candidate frequency in the system acquisition scan. Therefore, the speed at which the system acquisition scan is completed is increased using techniques of the present disclosure.

The act of assigning the pilot signal as the timing reference may be performed based on identifying a successful decoding of the information of the system. The information may be or include a system identification of the system. In a specific embodiment, the system identification is compared with a predetermined system identification of the requested system for communications. In response to a match, the system acquisition scan is terminated and the requested system is acquired for communications. On the other hand, the pilot signal may be assigned as the timing reference based on a mismatch between the system identification and the predetermined system identification.

A receiver circuitry of the present disclosure includes an AFC circuit; a controller adapted to operate the receiver circuitry to perform a system acquisition scan over a plurality of candidate frequencies in search for a requested system; a searcher adapted to detect a pilot signal of a system on one of the candidate frequencies in the system acquisition scan; and a decoder adapted to decode information of the system in the system acquisition scan. The controller is further adapted to maintain assignment of the pilot signal of the system as a timing reference in the receiver for remaining candidate frequencies in the system acquisition scan if the system is not the requested system. A mobile communication device of the present disclosure may include such receiver circuitry.

The above-described embodiments of the present application are intended to be examples only. Those of skill in the art may effect alterations, modifications and variations to the particular embodiments without departing from the scope of the application. For example, the techniques of the present disclosure may be applied to any system compatible with W-CDMA technologies or otherwise similarly configured. The invention described herein in the recited claims intends to cover and embrace all suitable changes in technology.

What is claimed is:

1. A system acquisition method for use in searching for a requested code division multiple access system with use of a receiver having an automatic frequency control (AFC) circuit, the method comprising the acts of:
   performing a system acquisition scan over a plurality of candidate frequencies;
   in the system acquisition scan:
      for each one of a plurality of pilot signals, detecting by a layer-1 processing component a pilot signal from a system on one of the candidate frequencies and decoding by a layer-2 processing component information from the system;
      offering by the layer-2 processing component the plurality of detected pilot signals to the layer-1 processing component;
      selecting, by the layer-1 processing component, one of the plurality of detected pilot signals offered by the layer-2 processing component that has the best quality; and
      if the system is different from the requested system, then assigning by the layer-1 processing component the selected pilot signal as a timing reference in the receiver for remaining candidate frequencies in the system acquisition scan.

2. The system acquisition scanning method of claim 1, wherein the act of assigning the pilot signal as the timing reference serves to reduce or eliminate an AFC window time for the AFC circuit for converging on a remaining candidate frequency in the system acquisition scan.

3. The system acquisition scanning method of claim 1, further comprising:
   prior to detecting any pilot signal and decoding any information in the system acquisition scan, employing an initial AFC window time for the AFC circuit; and
   wherein the act of assigning the pilot signal as the timing reference causes the initial AFC window time for the AFC circuit to be reduced or eliminated.

4. The system acquisition scanning method of claim 1, wherein the act of assigning is performed based on identifying a successful decoding of the information of the system.

5. The system acquisition scanning method of claim 1, wherein the information comprises a system identification of the system, the method comprising the further acts of:
   comparing the system identification with a predetermined system identification of the requested system for communications;
   wherein the requested system comprises one of a registered public land mobile network (RPLMN) or a home public land mobile network (HPLMN); and
   wherein the act of assigning the pilot signal as the timing reference is performed in response to a mismatch between the system identification and the predetermined system identification of the RPLMN or HPLMN.

6. The system acquisition scanning method of claim 1, wherein the information comprises a system identification of the system, the method comprising the further acts of:
   comparing the system identification with a predetermined system identification of the requested system for communications and, in response to a match:
   terminating the system acquisition scan; and
   causing the requested system to be acquired for communications.

7. The system acquisition scanning method of claim 1, wherein the best quality is the best received signal code power (RSCP) or Energy/Interference Ratio ($E_c/I_o$).

8. The system acquisition scanning method of claim 1, wherein the system acquisition scan is a wideband code division multiple access (W-CDMA) system acquisition scan.

9. A receiver circuitry for a system acquisition scan, comprising:
   an automatic frequency control (AFC) circuit;
   a controller configured to operate the receiver circuitry to perform a system acquisition scan over a plurality of candidate frequencies in search for a requested code division multiple access system;
   a layer-1 processing component configured to, for each one of a plurality of pilot signals, detect a pilot signal from a system on one of the candidate frequencies;
   a layer-2 processing component configured to, for each one of a plurality of detected pilot signals, decode information from the system;
   the layer-2 processing component being further configured to offer the plurality of detected pilot signals to the layer-1 processing component;
   the layer-1 processing component being further configured to select one of the plurality of detected pilot signals offered by the layer-2 processing component that has the best quality; and
   the layer-1 processing component being further configured to set and maintain assignment of the selected pilot signal as a timing reference in the receiver circuitry for remaining candidate frequencies in the system acquisition scan if the system is different from the requested system.

10. The receiver circuitry of claim 9, wherein in maintaining the assignment of the pilot signal as the timing reference, the layer-1 processing component operates to reduce an AFC window time of the AFC circuit for convergence on a remaining candidate frequency in the system acquisition scan.

11. The receiver circuitry of claim 9, further comprising:
   the AFC circuit having an initial AFC window time prior to the layer-1 processing component detecting any pilot signal and the layer-2 processing component decoding any information in the system acquisition scan; and
   wherein in maintaining assignment of the pilot signal as the timing reference, the layer-1 processing component operates to reduce or eliminate the initial AFC window time.

12. The receiver circuitry of claim 9, further comprising:
   the layer-1 processing component being further configured to set and maintain assignment of the pilot signal as the timing reference in response to the decoding of the information of the system by the layer-2 processing component.

13. The receiver circuitry of claim 9, further comprising:
the layer-2 processing component being further configured to decode information comprising a system identification of the system.

14. The receiver circuitry of claim 9, further comprising:
the layer-2 processing component being further configured to decode information comprising a system identification of the system; and
the layer-1 processing component being further configured to set and maintain assignment of the pilot signal as the timing reference in response to the decoding of the system identification of the system.

15. The receiver circuitry of claim 9, further comprising:
the layer-2 processing component being further configured to decode information comprising a system identification of the system;
the layer-1 processing component being further configured to compare the system identification with a predetermined system identification of the requested system for communications; and
the layer-1 processing component being further configured to set and maintain assignment of the pilot signal as the timing reference in response to a mismatch between the system identification and the predetermined system identification.

16. The receiver circuitry of claim 9, further comprising:
the layer-2 processing component being further configured to decode information comprising a system identification of the system;
the layer-1 processing component being further configured to compare the system identification with a predetermined system identification of the system for communications and, in response to a match:
terminate the system acquisition scan; and
causing the requested system to be acquired for communications.

17. The receiver circuitry of claim 9, wherein the layer-1 processing component is further configured to:
if the pilot signal used as the timing reference falls below a predetermined threshold value of quality:
deassign the pilot signal as the timing reference; and
reassigning a different pilot signal, if available, as the timing reference.

18. The receiver circuitry of claim 9, operative in accordance with wideband code division multiple access (W-CDMA).

19. A mobile communication device, comprising:
one or more processors;
a code divisional multiple access receiver having an automatic frequency control (AFC) circuit;
the one or more processors being configured to operate the receiver to perform a system acquisition scan over a plurality of candidate frequencies in search for a requested system;
a layer-1 processing component configured to, for each one of a plurality of pilot signals, detect a pilot signal from a system on one of the candidate frequencies;
a layer-2 processing component configured to, for each one of a plurality of detected pilot signals, decode information from the system;
the layer-2 processing component being further configured to offer the plurality of detected pilot signals to the layer-1 processing component;
the layer-1 processing component being further configured to select one of the plurality of detected pilot signals offered by the layer-2 processing component that has the best quality; and
the layer-1 processing component being further configured to set and maintain assignment of the pilot signal of the system as a timing reference in the receiver for remaining candidate frequencies in the system acquisition scan, if the system is different from the requested system.

20. The mobile communication device of claim 19, wherein in maintaining the assignment of the pilot signal as the timing reference, the layer-1 processing component operates to reduce an AFC window time of the AFC circuit for convergence on a remaining candidate frequency in the system acquisition scan.

21. The mobile communication device of claim 19, further comprising:
the AFC circuit having an initial AFC window time prior to the layer-1 processing component detecting any pilot signal and the layer-2 processing component decoding any information in the system acquisition scan; and
wherein in maintaining assignment of the pilot signal as the timing reference, the layer-1 processing component operates to reduce or eliminate the initial AFC window time.

22. The mobile communication device of claim 19, wherein the layer-1 processing component is further configured to:
if the pilot signal used as the timing reference falls below a predetermined threshold value of quality:
deassign the pilot signal as the timing reference; and
reassign a different pilot signal, if available, as the timing reference.

23. The mobile communication device of claim 19, wherein the receiver comprises a wideband code division multiple access (W-CDMA) receiver.

* * * * *